US011115693B2

(12) United States Patent
Ryan et al.

(10) Patent No.: US 11,115,693 B2
(45) Date of Patent: Sep. 7, 2021

(54) SOURCE CLOCK RECOVERY IN WIRELESS VIDEO SYSTEMS

(71) Applicant: Advanced Micro Devices, Inc., Santa Clara, CA (US)

(72) Inventors: Stephen Mark Ryan, Lilydale (AU); Carson Ryley Reece Green, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/367,090

(22) Filed: Mar. 27, 2019

(65) Prior Publication Data

US 2020/0314469 A1    Oct. 1, 2020

(51) Int. Cl.
*H04N 21/242* (2011.01)
*H04N 21/238* (2011.01)
*H04N 21/24* (2011.01)
*H04H 20/18* (2008.01)

(52) U.S. Cl.
CPC ..... *H04N 21/242* (2013.01); *H04N 21/23805* (2013.01); *H04N 21/2402* (2013.01); *H04H 20/18* (2013.01)

(58) Field of Classification Search
None
See application file for complete search history.

(56) References Cited

U.S. PATENT DOCUMENTS

| | | | | |
|---|---|---|---|---|
| 6,005,872 A * | 12/1999 | Bassi | | H04J 3/0632 370/477 |
| 6,018,556 A | 1/2000 | Janesch et al. | | |
| 7,609,727 B2 * | 10/2009 | Choi | | H04J 3/085 370/503 |
| 7,770,049 B1 | 8/2010 | Searles et al. | | |
| 7,772,889 B2 | 8/2010 | Naffziger | | |
| 2004/0047593 A1 * | 3/2004 | Ota | | H03L 7/16 386/201 |
| 2004/0196926 A1 * | 10/2004 | Chien | | H04L 7/042 375/316 |
| 2007/0103204 A1 * | 5/2007 | Egan | | H03M 9/00 327/100 |
| 2010/0021003 A1 * | 1/2010 | Baum | | G10L 19/018 382/100 |
| 2010/0071010 A1 * | 3/2010 | Elnathan | | H04N 5/06 725/81 |

FOREIGN PATENT DOCUMENTS

EP          0920220 A2 *  6/1999   ......... H04N 21/4305

* cited by examiner

*Primary Examiner* — James R Marandi
(74) *Attorney, Agent, or Firm* — Rory D. Rankin; Kowert, Hood, Munyon, Rankin & Goetzel, P.C

(57) ABSTRACT

Systems, apparatuses, and methods for performing efficient video transmission are disclosed. In a video processing system, a transmitter sends encoded pixel data to a receiver. The receiver stores the encoded pixel data in a buffer at an input data rate. A decoder of the receiver reads the pixel data from the buffer at an output data rate. Each of a transmitter and the receiver maintains a respective synchronization counter. When detecting a start of a frame, each of the transmitter and the receiver stores a respective frame start count as a copy of a current value of the respective synchronization counter. The transmitter sends its frame start count to the receiver. The receiver determines a difference between the respective frame start counts, and adjusts the decoding rate based on the difference.

20 Claims, 7 Drawing Sheets

Video Processing System 200

SOURCE CLOCK RECOVERY IN WIRELESS VIDEO SYSTEMS

BACKGROUND

Description of the Related Art

Video processing algorithms are complex and include many different functions. Computing systems use advanced processors to satisfy the high computation demands. The video processing complexity increases as display resolution increases. Additionally, high definition video encoding applications are growing rapidly in the consumer market space. Further, video processing becomes more complex as the data bandwidth decreases and the processing occurs in real-time. For example, virtual reality (VR) applications, such as VR gaming applications, are becoming more popular.

For VR applications, a wireless communication link sends a video stream from a computer (or other device) to a virtual reality (VR) headset (or head mounted display (HMD)). Transmitting the VR video stream wirelessly eliminates the need for a cable connection between the computer and the user wearing the HMD, thus allowing for unrestricted movement by the user. The VR video content is typically viewed through a lens to facilitate a high field of view and create an immersive environment for the user. In such a live streaming wireless system, the transmitter of video content is physically separated from the receiver with the display device. The transmitter and the receiver operate physically separate clocks. The separate clock sources generate clock signals with frequency differences. Over time, these frequency differences cause underflow and overflow conditions to occur for the storage of frame data as the frame data is processed and displayed.

In view of the above, efficient methods and systems for performing efficient video transmission are desired.

BRIEF DESCRIPTION OF THE DRAWINGS

The advantages of the methods and mechanisms described herein may be better understood by referring to the following description in conjunction with the accompanying drawings, in which.

Figure 1:
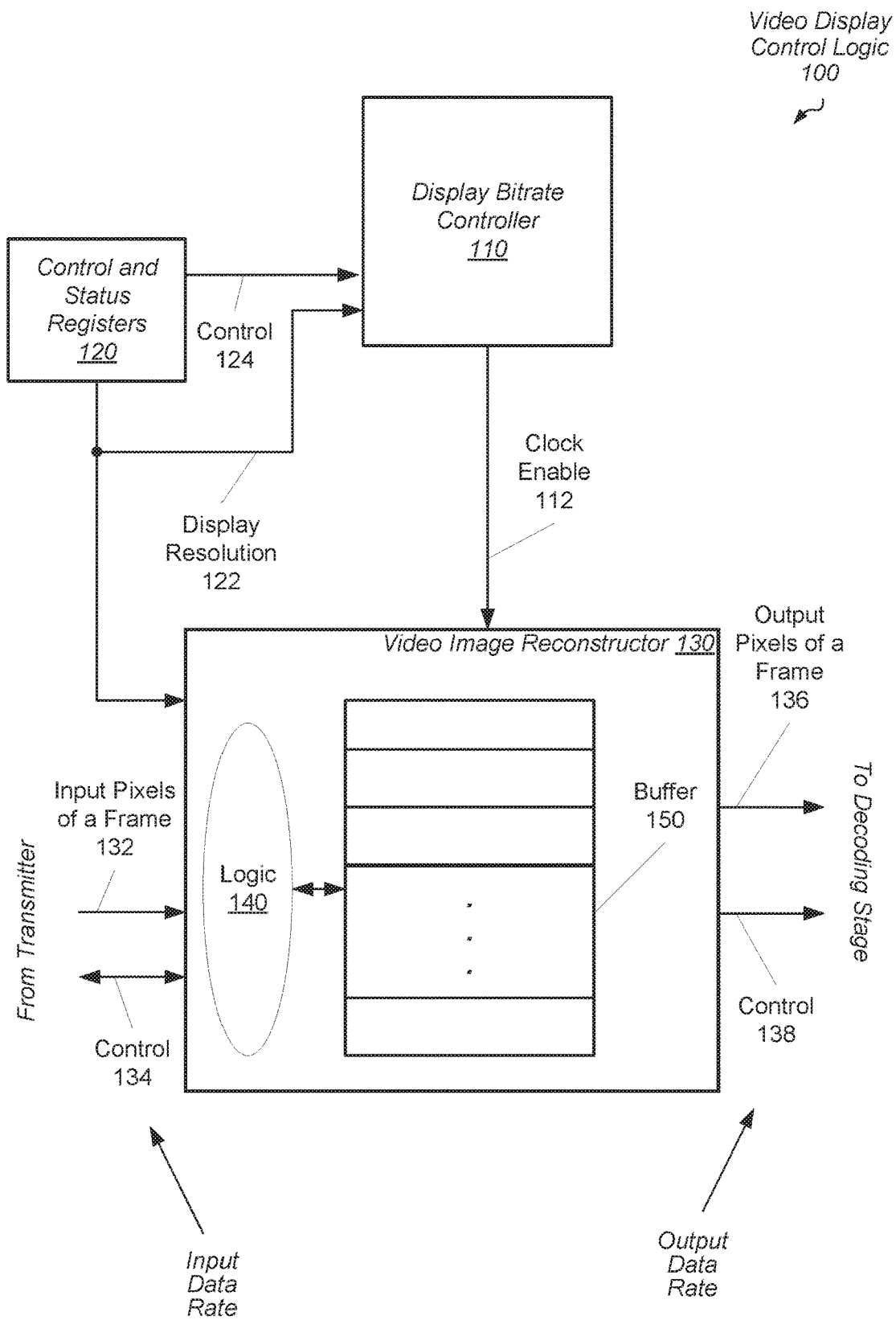
FIG. 1 is a block diagram of one embodiment of video processing logic.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient processor video transmission are disclosed. In various embodiments, a video processing system includes a transmitter sending a video stream over a wireless link to a receiver. In various embodiments, the transmitter renders pixel data and compresses the rendered pixel data. The transmitter stores the compressed pixel data in a first buffer. Following, the transmitter divides the stored pixel data into chunks and wirelessly sends the chunks of compressed pixel data to the receiver. In an embodiment, the receiver stores the received chunks in a second buffer at an input data rate. A pixel decoding stage in the receiver reads, at an output data rate, the compressed pixel data stored in the second buffer, de-chunks the compressed pixel data, and decompresses this data. The output data rate is also referred to as the pixel decoding data rate of the receiver, since the pixel decoding data rate sets the rate of accessing the second buffer in the receiver. Afterward, the pixel decoding stage sends the uncompressed pixel data to a display device via a display link. If the input data rate of the second buffer in the receiver does not match the output data rate of the second buffer, then underflow and overflow conditions occur for the second buffer, which reduces the visual quality of a scene presented to a user on the display device.

The input data rate of the second buffer in the receiver is set by clock domains used by processing stages in the transmitter and the receiver prior to data storage in the second buffer. The transmitter uses multiple processing stages to process pixels of frames prior to the receiver storing the pixels of frames into the second buffer. For example, the transmitter uses pre-rendering, rendering and encoding (compressing) stages, which use one or more clock domains. The slowest clock domain of these multiple clock domains used prior to data storage in the second buffer sets the input data rate.

The receiver includes a display bitrate controller, which sets the output data rate of the second buffer. Each of the transmitter and the receiver maintains a respective synchronization counter. In some designs, each of the transmitter and the receiver increments the synchronization counters periodically (e.g., each clock cycle). After startup of the transmitter and the receiver, when the transmitter detects a start of a frame, the transmitter stores a first frame start count as a copy of a current value of the synchronization counter in the transmitter, and sends the first frame start count to the receiver. The receiver adds one or more latencies to the first frame start count. In various embodiments, the receiver determines a count or number of clock cycles equivalent to the one or more latencies. In this manner, the receiver adjusts the first frame start count so that it approximately reflects a desired time that the decoder detects the start of frame after the encoder detects a start of frame. For example, if the first frame start count received from the transmitter had a value of X and the one or more latencies have a sum that is N, where N is a count that corresponds to the latency time (e.g., a latency of M expressed as an amount of time may be converted to a count N), then the receiver adjusts the received first frame start count of X to be equal to X+N. In an embodiment where the count is incremented each clock cycle, the latency may generally correspond to a number of clock cycles.

When the receiver detects a start of a frame for decoding, the receiver stores, or otherwise captures, a second frame start count as a copy of a current value of the synchronization counter in the receiver. In addition, the receiver compares the first frame start count (i.e., the captured and updated transmitter synchronization counter value) to the receiver counter value (i.e., the captured receiver synchronization counter value). In one example, the receiver determines a difference between the adjusted first frame start count and the second frame start count. Therefore, the receiver, in one embodiment, subtracts the second frame start count from the adjusted first frame start count to determine the difference. This difference can be positive or negative (or zero) depending on the values of the adjusted first frame start count and the second frame start count. The display bitrate controller of the receiver reduces the output data rate of the second buffer when the difference is positive (i.e., the first frame start count is greater than the second frame start count), and increases the output data rate of the second buffer when the difference is negative (i.e., the first frame start count is less than the second frame start count).

Referring to FIG. 1, a generalized block diagram of one embodiment of video display control logic 100 is shown. In many designs, the video display control logic 100 (or logic 100) is located in a receiver prior to video decoding logic and logic for a display device. For example, the logic 100 is located in a transceiver interface of a receiver device. Regardless of the particular location, the logic 100 receives the input pixels 132 of a frame at an input data rate, and provides the output pixels 136 of a frame at an output data rate. The logic 100 includes a buffer 150 within the video image reconstructor 130 for storing the received input pixels 132. The logic 100 also includes the display bitrate controller 110 for determining the output data rate via the clock enable 112. The display bitrate controller 110 adjusts the duty cycle of the clock enable 112 to attempt to match the output data rate to the input data rate. The output data rate is also referred to as the pixel decoding data rate of the receiver, since the pixel decoding data rate sets the rate of accessing the second buffer in the receiver. Each of the display bitrate controller 110 and the video image reconstructor 130 receives control parameters stored in the control and status register (CSRs) 120.

In various designs, the logic 100 is located in a receiver that receives data from a transmitter via a wireless connection. Therefore, the logic 100 is physically separated from the source (the transmitter) that generated the input pixels 132. The transmitter and the receiver with the logic 100 use physically separate clock domains. The separate clock sources, such as one of a variety of clock crystals, generate clock signals with frequency differences between the transmitter and the logic 100 in the receiver. Over time, these frequency differences cause underflow and overflow conditions to occur for the storage of frame data as the frame data is processed and displayed.

An image of a video frame is typically subdivided into a sequence of horizontal lines, which is further divided into discrete pixels for processing in a video processing system. This ordering of discrete pixels by rows is referred to a raster order, or the horizontal resolution. A raster image, or simply, an image, is characterized by the width and height of the image in pixels and by the number of bits per pixel, which defines the color depth. Images, or the pixels of the frame, are arranged in files with one of a variety of formats. The logic 140 and the buffer 150 support the selected file format. The video image reconstructor 130 sends the output block of pixels 136 to a decoding stage and a display device based on an order that follows the raster order, or the scanning of the horizontal video lines of the image. The video image reconstructor 130 also sends control signals 138, which include one or more of an indicator of a start of a next frame, an indication of an end of a current frame, an indicator of a start of a next horizontal line of a current frame, an indication of an end of a current horizontal line of the current frame, and so on.

The product of the number of vertical lines and the number of horizontal lines provides the display resolution 122, which is stored in the CSRs 120. If a single bit is used to represent each pixel, then the resolution 122 equates to the number of bits in a frame. If multiple bits are used per pixel, then the product of the number of bits per pixel and the resolution 122 equates to the number of bits in a frame. In some embodiments, the resolution 122 stored in the CSRs 120 corresponds to the total number of bits, rather than the total number of pixels, in a frame when the number of bits differs from the number of pixels.

Although the number of pixels and the number of bits per frame varies in some designs, for purpose of discussion, the video processing is described in terms of pixels. Translating to a number of bits when needed includes straightforward multiplication. In one example, a frame (or raster image) includes one million pixels. If the video processing system processes one pixel per clock cycle, then the video processing system uses one million clock cycles to process a frame. Ideally, the transmitter and the receiver process pixels of a frame at a same data rate. However, due to the physical separation of the transmitter and the receiver and the use of a wireless connection, it is possible that the receiver processes the frame in one million and two clock cycles. Without adjustments, the difference grows over time, which causes underflow and overflow conditions to occur for the buffer 150.

To perform the above adjustments, the display bitrate controller 110 adjusts the clock enable 112 to change the output data rate at which the logic 140 reads pixels of a frame from the buffer 150. For example, when the display bitrate controller 110 determines the receiver processed a frame with a latency of one million and two clock cycles, whereas, the transmitter (source) processed the frame with a latency of one million clock cycles, the display bitrate controller 110 adjusts the clock enable 112 to reduce the latency of the receiver. For example, the display bitrate controller 110 increases the duty cycle of the clock enable 112. In contrast, when the display bitrate controller 110 determines the receiver processed a frame with a latency of one million and ten clock cycles, whereas, the transmitter (source) processed the frame with a latency of one million and fourteen clock cycles, the display bitrate controller 110 adjusts the clock enable 112 to increase the latency of the receiver. For example, the display bitrate controller 110 decreases the duty cycle of the clock enable 112.

In some embodiments, the display bitrate controller 110 uses thresholds to determine whether the difference in latencies qualifies to adjust the duty cycle of the clock enable 112. Additionally, in an embodiment, the display bitrate controller 110 uses thresholds to determine the amount of adjustment of the duty cycle of the clock enable 112. In various embodiments, the display bitrate controller 110 receives the thresholds from programmable registers in the CSRs 120. In an embodiment, the display bitrate controller 110 prevents the ratio of the display resolution to the latency of the receiver for processing a frame to fall below the integer one. For example, if the display resolution 122 is one million pixels, the display bitrate controller 110 prevents adjusting the duty cycle of the clock enable 112 to cause the receiver to attempt to process the one million pixels of a frame in less than one million clock cycles. This is not feasible, so the display bitrate controller 110 uses the display resolution 122 as a limit.

Figure 2:
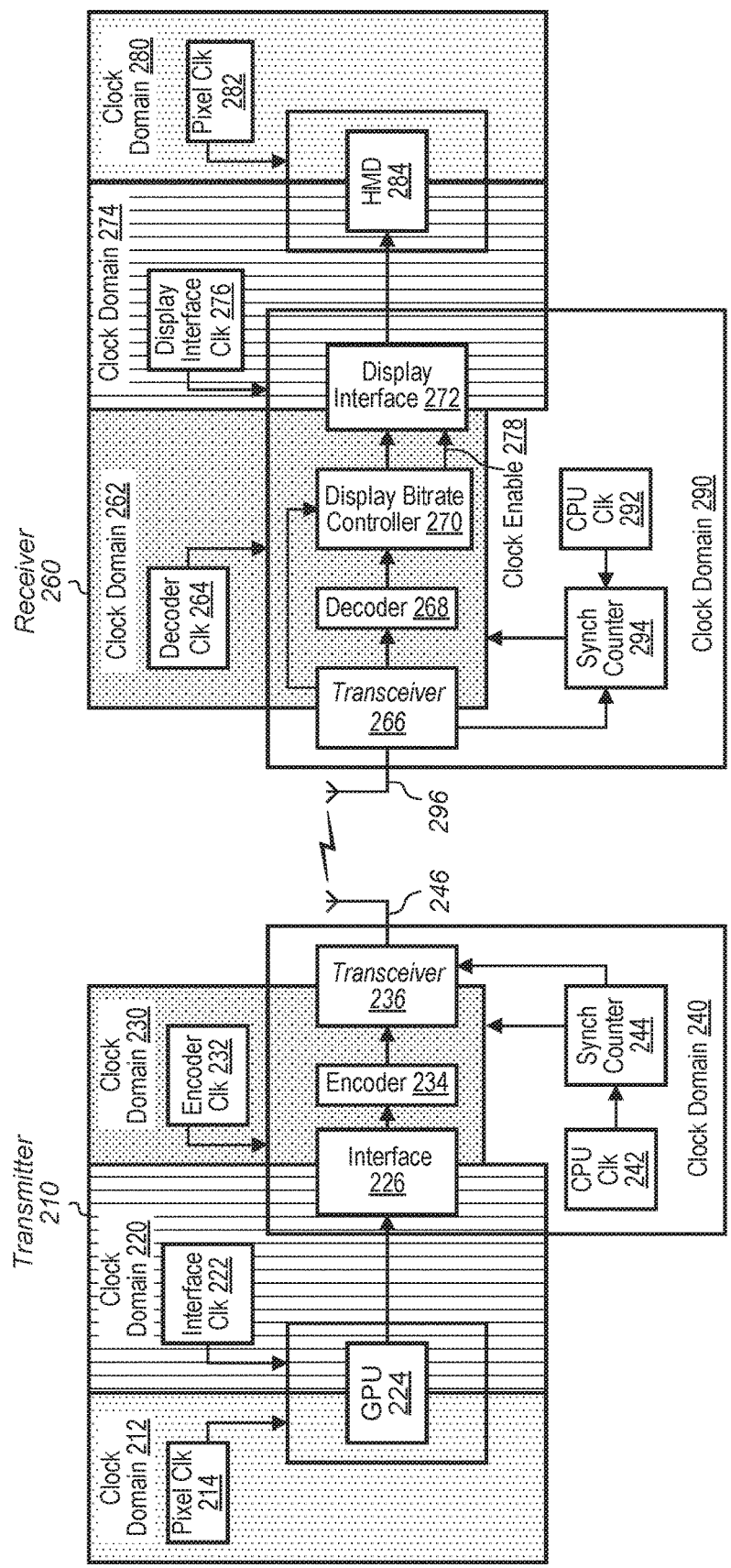
FIG. 2 is a block diagram of another embodiment of a video processing system.

Referring to FIG. 2, a generalized block diagram of one embodiment of video display control logic 200 is shown. The video processing system 200 (or system 200) includes at least a first communications device (e.g., transmitter 210) and a second communications device (e.g., receiver 260) operable to communicate with each other with a limited bandwidth connection that is inefficient for transmitting uncompressed pixel data. In fact, in many cases, the limited bandwidth connection is incapable of transmitting uncompressed pixel data. In some embodiments, the limited bandwidth connection is a wired connection. In other embodiments, such as the illustrated embodiment, the limited bandwidth connection is a wireless connection. It is noted that transmitter 210 and receiver 260 can also be referred to as transceivers. Transmitter 210 and receiver 260 are representative of any type of communication devices and/or computing devices. For example, in various implementations, transmitter 210 and/or receiver 260 is one of a mobile phone, a tablet, a desktop computer, a laptop computer, a server, a head-mounted display (HMD), a television, another type of display, router, or other types of computing or communication devices.

In various designs, the transmitter 210 sends video information to the receiver 260 such as rendered and encoded (compressed) pixels of a video frame. The transmitter 210 includes any number and type of processors and memory devices. Examples of the processors are a general-purpose central processing unit (CPU), a graphics processing unit (GPU) 224, an accelerated processing unit (APU), an application specific integrated circuit (ASIC), a field programmable array (FGPA), a video encoder (234), and so forth. Memory devices (not shown) in the transmitter 210 include one or more of a variety of types of synchronous random access memory (SRAM), a variety of types of dynamic random access memory (DRAM), hard disk drives (HDDs), solid state drives (SSDs), and so forth.

In various implementations, the transmitter 210 uses a communication fabric (or fabric), for high-level interconnects and chip communication. The fabric is not shown for ease of illustration. In various embodiments, different types of data flows independently through the fabric. The fabric supports the independent flow by allowing a single physical fabric bus to include a number of overlaying virtual channels, or dedicated source and destination buffers, each carrying a different type of data such as messages, read transactions, response transactions, write transactions and so forth. Each channel is independently flow controlled with no dependence between transactions in different channels.

The CPU uses one or more processor cores with circuitry for executing instructions according to one of a variety of predefined general-purpose instruction sets. In some designs, the processor cores use simultaneous multi-threading techniques combined with out-of-order scheduling and execution of instructions. The GPU 224 uses multiple parallel execution lanes in a single instruction multiple data word (SIMD) micro-architecture. The multiple parallel execution lanes are also referred to as SIMD units or SIMD lanes. The SIMD lanes operate in lockstep. Each of the SIMD lanes independently processes a unit of data independently of other units of data, but uses the same sequence of operations or commands as used by other SIMD lanes. In one example, one or more of an operating system scheduler and a command processor in the GPU schedules commands on the SIMD lanes. In some implementations, the GPU 224 includes a pixel-processing pipeline. In other implementations, the pixel-processing pipeline is located externally from the GPU 224. One or more of the SIMD lanes and the pixel-processing pipeline performs pixel value calculations, vertex transformations, and other graphics operations such as color management, ambient-adaptive pixel (AAP) modification, dynamic backlight control (DPB), panel gamma correction, and dither.

In various implementations, the video encoder 234 encodes (i.e., compresses) a video stream of pixel data prior to transmitting the pixel data to receiver 260. In various implementations, the video encoder 234 (or encoder 234) is implemented using any suitable combination of hardware and/or software such as firmware. In an embodiment, the encoder 234 generates bits in a bitstream and stores them in a buffer in the transceiver 236. As used herein, a "bitstream" is a sequence of bits. As used herein, a "block" is defined as a group of contiguous pixels. For example, in one implementation, a block is a group of 8×8 contiguous pixels that form a square in the image being displayed. In other implementations, other shapes and/or other sizes of blocks are used. Sometimes, a rendered and compressed output block of pixels of the video frame is expressed as a "bitrate," which is a number of bits that are generated or processed per unit of time. For example, in some designs, the bitrate is expressed in units of kilobits per second (kbps) or megabits per second (mbps).

The encoder 234 receives uncompressed, rendered video information and generates the bits in the form of a bitstream in a compressed format that conforms to a standard video compression specification. Examples of the compression specification or standard are MPEG-2 Part 2, MPEG-4 Part 2, H.264 (MPEG-4 Part 10), H.265 (High Efficiency Video Coding for supporting the compression of 4K video), Theora, RealVideo RV40, VP9, and AV1. The compression provided by the encoder 234 is typically lossy, so the output compressed video information lacks some of the information present in the original, rendered and uncompressed video information. The video information is typically divided into frames, and the frames are sometimes divided into macroblock, or blocks. A consequence of the lossy compression is attempting to determine which regions of the block or the frame video information to compress with higher compression ratios and which regions to compress with lower compression ratios. In addition, the compression algorithms track the amount of data used to represent the video, which is determined by the bitrate, while also tracking the storage levels of buffers storing the compressed video information to avoid underflow and overflow conditions.

In various implementations, one or more of the CPU and the GPU 224 determines the compression level for the encoder 234 to use when compressing blocks of pixels of the frame. As used herein, a "compression level" is also referred to as an "amount of compression" or a "compression ratio." The larger the compression level or the compression ratio, the greater the amount of compression and the smaller the amount of included video information, which is also referred to as a lower bitrate. Similarly, the smaller the compression level or the compression ratio, the smaller the amount of compression and the greater the amount of included video information, which is also referred to as a higher bitrate.

In some implementations, the CPU determines a point of focus on the screen is a foveated region, which is where the user is actually looking based on such as at the user's object (e.g., a race car, a soldier, a football player). A secondary point of focus is one of an opposing player's object, a window displaying statistical data in a bar at the bottom of the screen, and so on. As used herein, the term "point of focus" is defined as the portion of the frame where each eye is expected to be focusing when a user is viewing the frame.

In some cases, the point of focus is determined based at least in part on an eye-tracking sensor in the HMD 284 detecting the location where the eye is pointing. In other cases, the "point of focus" is determined based on the content of the frame data. For example, a scrollbar at the bottom of the frame with statistics of a video game, scores of sports events, or other is predicted to be viewed by the user within a short time period. The CPU sends commands to the GPU 224 to render a frame and sends commands to the encoder 234 to compress a rendered frame. In some implementations, the GPU 224 sends rendered pixels of a frame to the encoder 234 via an interface 226. In some designs, the GPU 224, the interface 226 and the encoder 234 use one of a variety of communication protocols for transferring pixels of a frame such as HDMI (High-Definition Multimedia Interface), DisplayPort (DP), or other.

To transfer the rendered and compressed pixels of a frame, in some implementations, transmitter 210 and receiver 260 communicate wirelessly over the unlicensed 60 Gigahertz (GHz) frequency band. As shown, system 200 uses a wireless connection for transferring data between the transmitter 210 and receiver 260. For example, in one implementation, transmitter 210 and receiver 260 communicate in accordance with the Institute of Electrical and Electronics Engineers (IEEE) 802.11ad standard (i.e., WiGig). In other implementations, transmitter 210 and receiver 260 communicate wirelessly over other frequency bands and/or by complying with other wireless communication protocols, whether according to a standard or otherwise. For example, other wireless communication protocols that can be used include, but are not limited to, Bluetooth®, protocols utilized with various wireless local area networks (WLANs), WLANs based on the Institute of Electrical and Electronics Engineers (IEEE) 802.11 standards (i.e., WiFi), mobile telecommunications standards (e.g., CDMA, LTE, GSM, WiMAX), etc. Wireless communication devices that operate within extremely high frequency (EHF) bands, such as the 60 GHz frequency band, are able to transmit and receive signals using relatively small antennas. In some implementations, transmitter 210 and receiver 260 perform periodic beamforming training procedures to determine the optimal transmit and receive antenna combinations for wireless data transmission.

In one implementation, transmitter 210 and receiver 260 have directional transmission and reception capabilities, and the exchange of communications over the link utilizes directional transmission and reception. Each directional transmission is a transmission that is beamformed so as to be directed towards a selected transmit sector of antenna 246. Similarly, directional reception is performed using antenna settings optimized for receiving incoming transmissions from a selected receive sector of antenna 296. The link quality can vary depending on the transmit sectors selected for transmissions and the receive sectors selected for receptions. The transmit sectors and receive sectors which are selected are determined by system 200 performing a beamforming training procedure.

In one implementation, the video processing system 200 executes a virtual reality (VR) application for wirelessly transmitting frames of a rendered virtual environment from transmitter 210 to receiver 260. In other implementations, the video processing system 200 includes other types of applications that take advantage of the methods and mechanisms described herein. In one implementation, transmitter 210 includes at least radio frequency (RF) transceiver module 236 and antenna 246. RF transceiver module 236 transmits and receives RF signals. In one implementation, RF transceiver module 236 is an mm-wave transceiver module operable to wirelessly transmit and receive signals over one or more channels in the 60 GHz band. RF transceiver module 236 converts baseband signals into RF signals for wireless transmission, and RF transceiver module 236 converts RF signals into baseband signals for the extraction of data by transmitter 210.

It is noted that RF transceiver module 236 is shown as a single unit for illustrative purposes. It should be understood that, in other implementations, the transmitter 210 includes any number of different units (e.g., chips) depending on the implementation of the RF transceiver module 236. Transmitter 210 also includes antenna 246 for transmitting and receiving RF signals. Antenna 246 represents one or more antennas, such as a phased array, a single element antenna, a set of switched beam antennas, etc., that can be configured to change the directionality of the transmission and reception of radio signals. As an example, antenna 246 includes one or more antenna arrays, where the amplitude or phase for each antenna within an antenna array can be configured independently of other antennas within the array. Although antenna 246 is shown as being external to transmitter 210, in other implementations, antenna 246 is included internally within transmitter 210. Additionally, in other embodiments, transmitter 210 is included in any number of other components, which are not shown to avoid obscuring the figure. Similar to transmitter 210, the components implemented within receiver 260 include at least RF transceiver module 266, decoder 268, memory (not shown), and antenna 296, which are analogous to one or more of the components described above for transmitter 210. It should be understood that receiver 260 can also include or be coupled to other components such as the HMD 284.

The decoder 268 decodes (i.e., decompresses) received pixels of a frame. The decompressed pixels of the frame are sent to the HMD 284 via display interface 272. Similar to components in the transmitter 210, the decoder 268, the display interface 272 and the HMD 284 use one of a variety of communication protocols for transferring pixels of a frame such as HDMI, DisplayPort (DP), or other. In various designs, the transceiver 266 includes a buffer, which is equivalent to the buffer 150 (of FIG. 1). In addition, the display bitrate controller 270 is equivalent to the display bitrate controller 110 (of FIG. 1) and the clock enable 278 is equivalent to the clock enable 112 (of FIG. 1).

In various implementations, one or more of the transmitter 210 and the receiver 260 uses multiple clock domains. In one implementation, the transmitter 210 uses separate clock domains 212, 220, 240 and 230, whereas, the receiver 260 uses the separate clock domains 262, 274, 280 and 290. In the transmitter 210, the clock domain 212 uses rendering pixel clock 214, the clock domain 220 uses display interface clock 222, and the clock domain 230 uses encoder clock 232. In the receiver 260, the clock domain 262 uses decoder clock 264, the clock domain 274 uses display interface clock 276, and the clock domain 280 uses display pixel clock 282. Phase lock loops (PLLs), clock crystals and other clock generating circuitry are not shown for ease of illustration. In some embodiments, the frequencies of the encoder clock 232 and the decoder clock 264 are nominally the same. Nevertheless, these two clocks can drift or otherwise vary from one another due to various conditions understood by those skilled in the art.

The transmitter 210 and the receiver 260 use physically separate clock signals derived from physically different clock domains. Even with careful design, without the display bitrate controller 270, there can be small clock frequency differences between the clock domains of the transmitter 210 and the clock domains of the receiver 260. Over time, these frequency differences cause underflow and/or overflow conditions to occur for the storage of frame data such as the buffer (not shown) in the transceiver 266. In various embodiments, the display bitrate controller 270 generates the clock enable 278 to set the output data rate of the buffer to match the input data rate of the buffer.

In various embodiments, each of the transmitter 210 and the receiver 260 maintains a respective one of the synchronization counters 244 and 294. The synchronization counters 244 and 294 use the CPU clock signals 242 and 292 based on the clock domains 240 and 290, respectively. In some embodiments, each of the synchronization counters 244 and 294 is an IEEE 802.11 standard 64-bit timing synchronization function (TSF) counter. In some embodiments, the transmitter 210 is the access point that generates a synchronization count at a given rate and sends updates (e.g., periodic or otherwise) to each of the synchronization counters 244 and 294 to achieve timing synchronization in the separate clock domains 240 and 290. In various embodiments, the transmitter 210 includes logic (not shown) for implementing the IEEE 802.11 wireless local area network (WLAN) standard to provide timing synchronization between the transmitter 210 and the receiver 260. The transmitter 210 periodically sends the current value of the synchronization count through beacon frames (e.g., during beamforming training, etc.), which are different from the video frames, to the receiver 260. In an embodiment, the count values of the synchronization counters 244 and 294 are sampled by one or more of hardware and software at the start of each incoming and outgoing frame.

After startup of the transmitter 210 and the receiver 260 where the encoder 234 and the decoder 268 are enabled, the transmitter 210 detects a start of a video frame for encoding. In various embodiments, this video frame includes video content to be conveyed for display on a receiving device. As such, this video frame is not the same as a synchronization or other training frame included in a beacon such as that discussed above. The data in the first portion or packet of the video frame includes a start of frame indication (e.g., a flag or bits which indication a start of a frame). Similarly, the data in the last chunk or packet of the video frame includes an end of frame flag. In various embodiments, when the transmitter 210 detects a start of video frame, the transmitter 210 stores a first frame start count as a copy of a current value of the synchronization counter 244. The transmitter 210 sends the first frame start count to the receiver 260. This communication is different from the transmitter 210 sending a beacon frame with the current value of the synchronization count used to synchronize the separate clock domains 240 and 290. In various embodiments, the transmitter 210 sends the first frame start count to the receiver 260 during a data transmission interval.

In an embodiment, the receiver 260 adds one or more latencies to the received first frame start count. In some embodiments, the one or more latencies include an expected transmission latency from the transmitter to the receiver and an expected latency for the decoder to detect the start of frame flag. As one example, the expected transmission latency may be 100 microseconds and the expected latency for detecting the start of frame flag by the decoder may be 2 milliseconds. However, in other designs, other latency values are possible and contemplated. In various embodiments, the receiver 260 determines a count of clock cycles equivalent to the duration of the expected one or more latencies. The receiver 260 increments the first frame start count by this number of clock cycles. When the receiver 260 detects a start of a video frame for decoding, the receiver 260 stores a second frame start count as a copy of a current value of the synchronization counter 294.

In some embodiments, the receiver 260 compares the first frame count to the second frame count to determine which count is greater. In one embodiment, the receiver 260 performs the comparison by subtracting the second frame start count from the first frame start count. In some designs, the display bitrate controller 270 receives the first frame start count and the second frame start count. Afterward, the display bitrate controller 270 determines the difference between the first frame start count and the second frame start count. Therefore, the display bitrate controller 270, in one embodiment, subtracts the second frame start count from the updated (incremented) first frame start count to determine the difference. The difference is a positive or negative value based on the values of the adjusted first frame start count and the second frame start count. In various embodiments, the display bitrate controller 270 reduces the output data rate of the buffer in the transceiver 266 when the difference is positive, or the first frame count is greater than the second frame count. When the receiver determines the first count is not equal to the second count, this indicates that the decoding process is either ahead of, or behind, the encoding process. Accordingly, the logic in the receiver adjusts the output data rate (i.e., decoder pipeline data rate or pixel decoding data rate) to increase or decrease the decoding rate as needed to better match the encoding rate. In some embodiments, the decoding rate is adjusted by adjusting the rate at which data is read out of the receive buffer.

Figure 3:
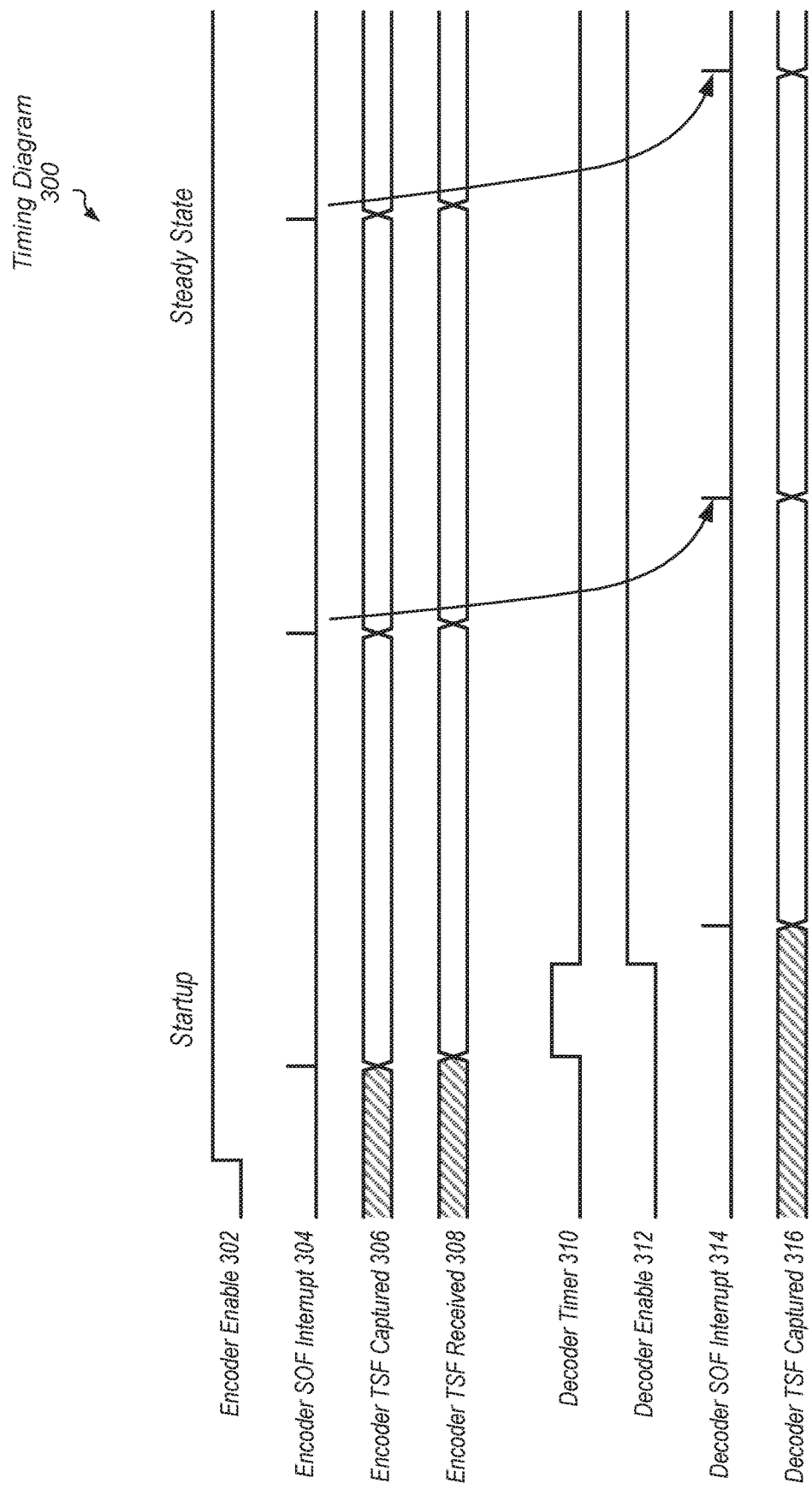
FIG. 3 is a block diagram of another embodiment of a timing diagram.

Referring to FIG. 3, a generalized block diagram of one embodiment of a timing diagram 300 is shown. The timing diagram 300 shows how the signals 302-316 of the transmitter and the receiver in a video processing system transition in both a startup stage and a steady state stage. During startup, initially each of the encoder and the decoder are disabled as shown by the de-asserted signals 302 and 312. As used herein, a signal is considered "asserted" when a value of the signal enables control logic and other circuitry. In some implementations, a Boolean high value is used to assert a signal. In other implementations, a Boolean low value is used to assert a signal. Here, in the illustrated embodiment of the timing diagram 300, the Boolean high value is used to indicate an asserted value, but in other embodiments, the Boolean low value is used.

After the encoder is enabled in the transmitter as shown by the assertion of the signal 302, frame data is received, and the signal 304 is asserted briefly. Signal 304 indicates the encoder start of frame (SOF) interrupt has occurred. For example, the encoder detected a start of frame flag in packet data of a video frame and an interrupt is generated in response. It is noted that while interrupt driven processing is variously described herein, other embodiments need not be interrupt driven. In response, the transmitter stores (captures or samples) a first frame start count as a copy of a current value of the synchronization counter in the transmitter as shown by the signal 306. In some embodiments, firmware performs these steps. In other embodiments, hardware performs these steps. In yet other embodiments, a combination of hardware and software samples the synchronization counter.

The transmitter sends the first frame start count to the receiver as shown by the signal 308. When the receiver receives the first frame start count as shown by signal 308, the receiver adds one or more latencies to the received first frame start count such as a start of frame interrupt latency and system signal propagation latency. In various embodiments, the receiver determines a count of clock cycles equivalent to the duration of the start of frame interrupt latency and the system signal propagation latency. The receiver increments the first frame start count by this number of clock cycles. Additionally, the receiver stores (captures or samples) a second frame start count as a copy of a current value of the synchronization counter in the receiver.

The receiver initializes a timer with a result of subtracting the first count from the second count, and starts the timer. Signal 310 indicates when the timer is initialized. In various embodiments, each of the two synchronization counters and the timer increment according to a same time period (e.g., every microsecond, every clock cycle where the clock frequencies are approximately equal, etc.). In an implementation, the time period is a microsecond, but in other implementations, any other time period is used. When the timer expires as shown by signal 310, the receiver enables the decoder as indicated by signal 312. Afterward, the decoder receives a start of frame interrupt as indicated by signal 314. For example, when the decoder detects a start of frame flag in received data, an interrupt is generated and the decoder reads pixel data from a buffer in the receiver and begins decompressing the pixel data.

After the startup stage, the transmitter and the receiver enter the steady state stage. Now, the receiver no longer uses the timer. In addition, in the steady state stage, the receiver samples the second synchronization counter in the receiver when the receiver detects the start of a frame via the interrupt indicated by the signal 314. Afterward, the receiver determines a difference between the first frame start count and the second frame start count. Therefore, the receiver, in one embodiment, subtracts the second frame start count from the adjusted first frame start count to determine the difference. The difference is a positive or negative value based on the values of the adjusted first frame start count and the second frame start count. The receiver adjusts the output data rate of the buffer in the transceiver of the receiver prior to the decoder based on the difference.

Figure 4:
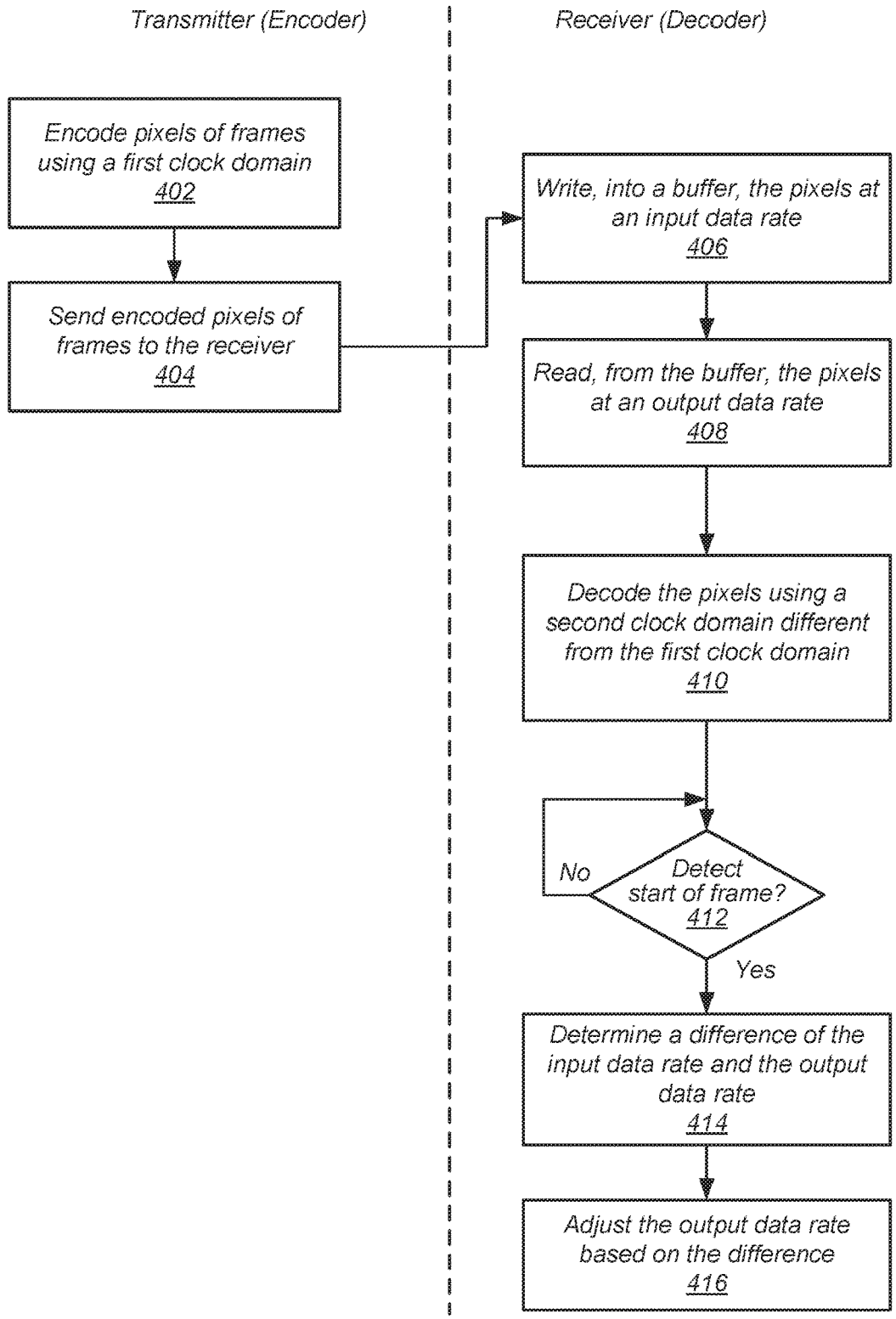
FIG. 4 is a flow diagram of one embodiment of a method for performing efficient video transmission.

Referring now to FIG. 4, one embodiment of a method 400 for performing efficient video transmission is shown. For purposes of discussion, the steps in this embodiment (as well as in FIGS. 4-6) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement methods 400-700.

A transmitter encodes pixels of frames using a first clock domain (block 402). The transmitter sends the encoded pixels of frames to the receiver (block 404). In some embodiments, the transmitter divides the stored pixel data into chunks, which is also referred to as packetizing the stored pixels. In various embodiments, data of a video frame is transferred between the transmitter and the receiver via a wireless connection during a data transmission interval. As described earlier, the data of the video frame is different from the data of a training beacon frame storing the current value of the synchronization count used to synchronize the separate clock domains. The data in the first chunk or packet of the video frame includes a start of frame flag. Similarly, the data in the last chunk or packet of the video frame includes an end of frame flag. The receiver writes, into a buffer in a transceiver, the encoded pixels of a received video frame at an input data rate (block 406). The receiver reads, from the buffer, the pixel data at an output data rate (block 408). In some embodiments, the receiver de-packetizes the received pixels. The receiver decodes the encoded pixels from the buffer using a second clock domain different from the first clock domain (block 410).

If the receiver does not detect a start of a frame for decoding ("no" branch of the conditional block 412), then control flow of method 400 returns to the conditional block 412 as the receiver waits for the interrupt. If the receiver detects the start of a frame ("yes" branch of the conditional block 412), then the receiver determines a difference between the input data rate and the output data rate of the buffer (block 414). The input data rate is the rate that the transmitter generates pixels of frames, sends the pixels of frames and the pixels of frames are stored in a buffer. The output data rate is the rate that the receiver reads the pixels of frames from the buffer, decodes the encoded pixels of frames and sends decompressed pixels of frames to the display device. The receiver, in one embodiment, subtracts the output data rate from the input data rate to determine the difference. The difference is a positive or negative value based on the values of the input data rate and the output data rate. The receiver adjusts the output data rate based on the difference (block 416). In various embodiments, the receiver reduces the output data rate of the buffer when the output data rate is greater than the input data rate. The receiver increases the output data rate of the buffer when the output data rate is less than the input data rate.

When the receiver determines the input data rate is greater than the output data rate, this indicates that the encoder is encoding video frames faster than the decoder is decoding video frames. Therefore, the receiver increases the decoding rate as needed to better match the encoding rate. In contrast, when the receiver determines the input data rate is less than the output data rate, this indicates that the encoder is encoding video frames at a slower rate than the decoder is decoding video frames. Therefore, the receiver decreases the decoding rate. In some embodiments, logic in the receiver directly adjusts the rate at which the decoder reads data from a buffer storing the encoded pixels of the video frame. In other embodiments, logic in the receiver indirectly adjusts the rate at which the decoder reads data from the buffer storing the encoded pixels of the video frame by adjusting the rate at which data flows through the decoder pipeline. In one embodiment, the logic adjusts the rate at the end of the decoder pipeline, which causes a controllable amount of backpressure through the pipeline to the front of the decoder pipeline. Consequently, the rate at which the decoder reads data from the buffer is indirectly adjusted.

Figure 5:
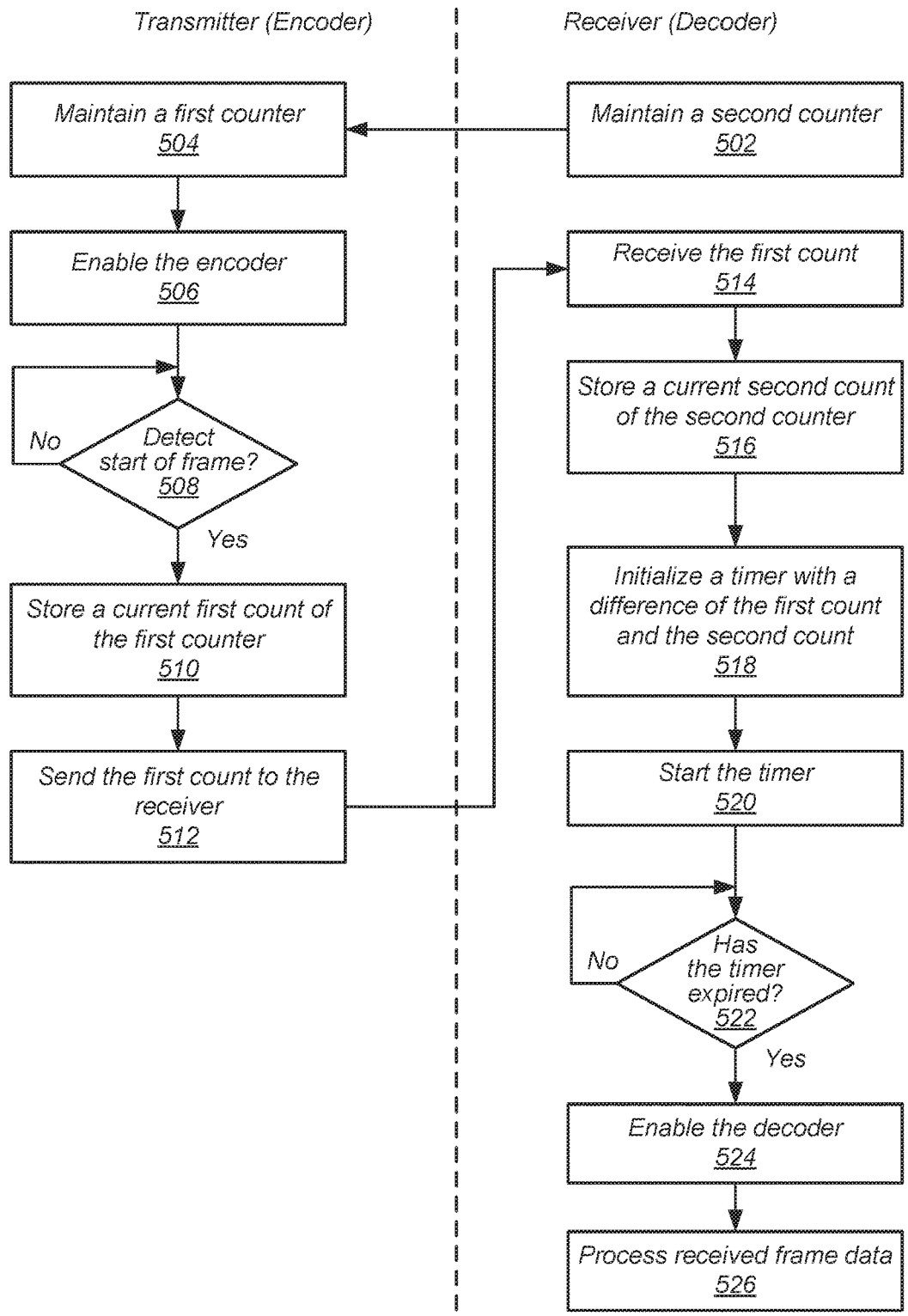
FIG. 5 is a flow diagram of one embodiment of a method for performing efficient video transmission.

Referring now to FIG. 5, one embodiment of a method 500 for performing efficient video transmission is shown. The receiver maintains a second counter, which is used as a synchronization counter (block 502). The transmitter maintains a first counter, which is also used as a synchronization counter (block 504). The transmitter enables the previously disabled encoder (block 506). If the transmitter does not detect a start of a frame interrupt ("no" branch of the conditional block 508), then control flow of method 500 returns to the conditional block 508 as the transmitter waits for the interrupt.

If the transmitter detects the start of a frame interrupt ("yes" branch of the conditional block 508), then the transmitter stores a current first count of the first counter (block 510). Therefore, the transmitter samples the first counter at a detected start of a frame in the transmitter. The transmitter sends the first count to the receiver (block 512). The receiver receives the first count (block 514), and in response to determining the decoder is disabled, the receiver stores a current second count of the second counter (block 516). Therefore, the receiver samples the second counter responsive to determining the decoder is disabled and at a time of detecting the received first count. In some embodiments, the receiver also adds one or more latencies to the received first count such as a start of frame interrupt latency and system signal propagation latency. In various embodiments, the receiver determines a count of clock cycles equivalent to the duration of the start of frame interrupt latency and the system signal propagation latency. The receiver increments the first frame start count by this number of clock cycles.

In some embodiments, the receiver enables the decoder after a delay. In an embodiment, the receiver determines the delay based on a difference between the received first count and the captured second count. The receiver initializes a timer with a result of subtracting the second count from the first count (block 518), and starts the timer (block 520). If the receiver does not detect that the timer has expired ("no" branch of the conditional block 522), then control flow of method 500 returns to the conditional block 522 as the receiver waits for the timer to expire. If the receiver detects that the timer has expired ("yes" branch of the conditional block 522), then the receiver enables the decoder (block 524). Afterward, the receiver processes received frame data (block 526). For example, the receiver waits for a start of frame interrupt, and then sends rendered and compressed pixels of the frame to the decoder to be decompressed.

Figure 6:
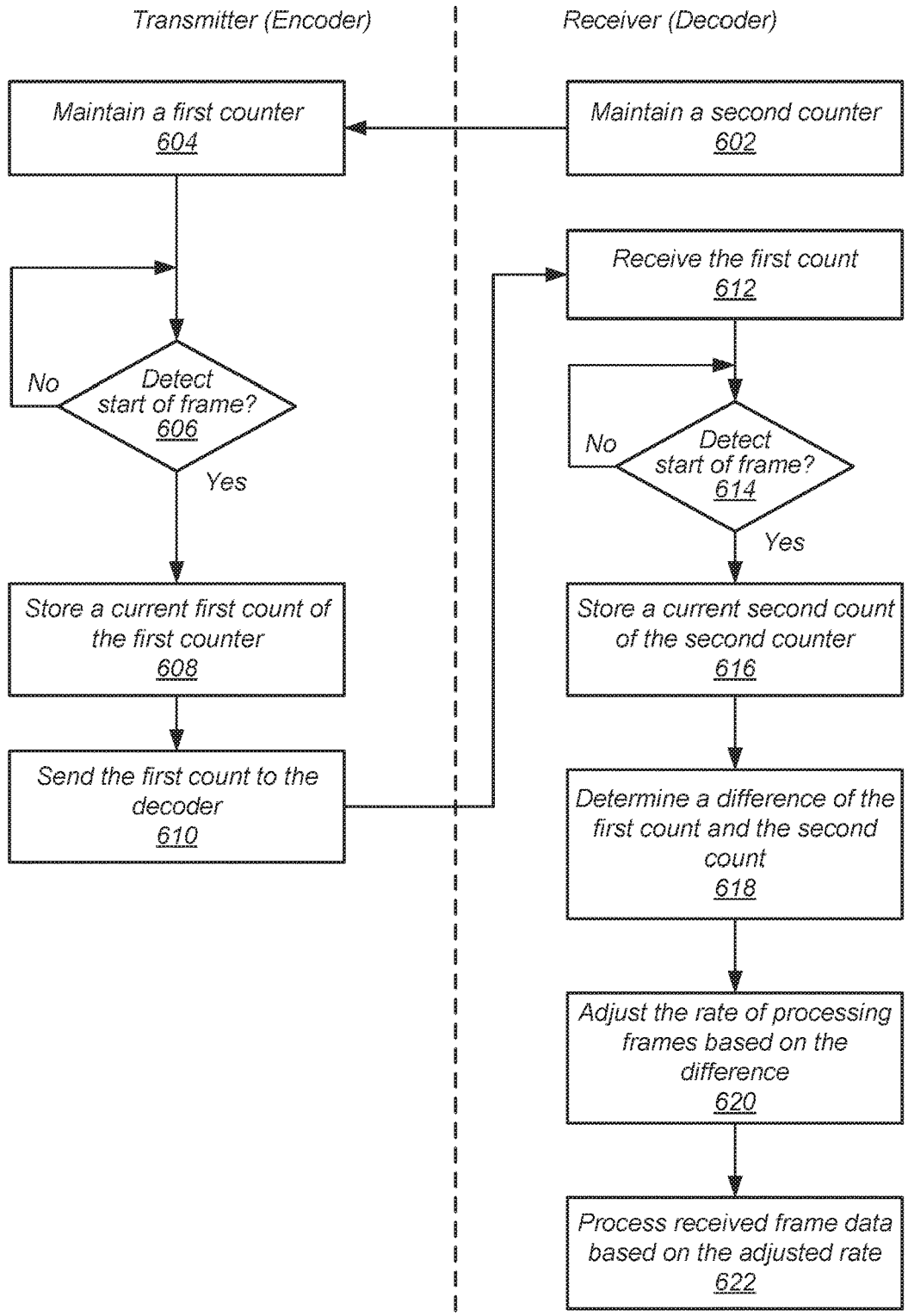
FIG. 6 is a flow diagram of one embodiment of a method for performing efficient video transmission.

Referring now to FIG. 6, one embodiment of a method 600 for performing efficient video transmission is shown. The receiver maintains a second counter, which is used as a synchronization counter (block 602). The transmitter maintains a first counter, which is also used as a synchronization counter (block 604). In some embodiments, each of the first counter and the second counter is a TSF counter used in a clock synchronization protocol. Each of the encoder in the transmitter and the decoder in the receiver is enabled. The transmitter detects a start of a frame by detecting a start of frame interrupt, detecting a start of frame flag stored in data to encode, or otherwise. If the transmitter does not detect a start of a frame ("no" branch of the conditional block 606), then control flow of method 600 returns to the conditional block 606 as the transmitter waits for the start of frame in the transmitter.

If the transmitter detects the start of a frame ("yes" branch of the conditional block 606), then the transmitter stores a current first count of the first counter (block 608). Therefore, the receiver samples the first counter at a time of detecting a start of a frame in the transmitter. The transmitter sends the first count to the receiver (block 610). The receiver receives the first count (block 612). In some embodiments, the receiver also adds one or more latencies to the received first count such as a start of frame interrupt latency and system signal propagation latency. In various embodiments, the receiver determines a count of clock cycles equivalent to the duration of the start of frame interrupt latency and the system signal propagation latency. The receiver increments the first count by this number of clock cycles.

If the receiver does not detect a start of a frame ("no" branch of the conditional block 614), then control flow of method 600 returns to the conditional block 614 as the receiver waits for the interrupt. The receiver detects a start of a frame by detecting a start of frame interrupt, detecting a start of frame flag stored in data to decode, or otherwise. If the receiver detects the start of a frame ("yes" branch of the conditional block 614), then the receiver stores a current second count of the second counter (block 616). Therefore, the receiver samples the second counter at a time of detecting a start of a frame in the receiver. The receiver compares the first count and the second count and determines a difference between the two (e.g., by subtracting the second count from the first count, etc.) (block 618). The receiver then adjusts the rate of processing frames based on the difference between the first count and the second count (block 620). Therefore, the receiver, in one embodiment, subtracts the second count from the first count to determine the difference. The difference is a positive or negative value based on the values of the first count and the second count. In various embodiments, the receiver reduces the output data rate of the buffer placed prior to the display device when the difference is positive (i.e., the first count is greater than the second count), and increases the output data rate of the buffer when the difference is negative (i.e., the first count is less than the second count).

For example, when the receiver determines the first count is greater than the second count, this indicates that the decoder detected a start of video frame for decoding before the encoder detected a start of video frame for encoding (plus any additional latencies) which indicates the decoder is ahead of the encoder. Accordingly, the logic in the receiver decreases the decoding rate. In contrast, when the receiver determines the first count is less than the second count, this indicates that the decoder detected a start of video frame for decoding after the encoder detected a start of video frame for encoding (plus any additional latencies) and the decoder is behind the encoder. Accordingly, the logic in the receiver increases the decoding rate and processes data at the increased processing rate (block 622).

Figure 7:
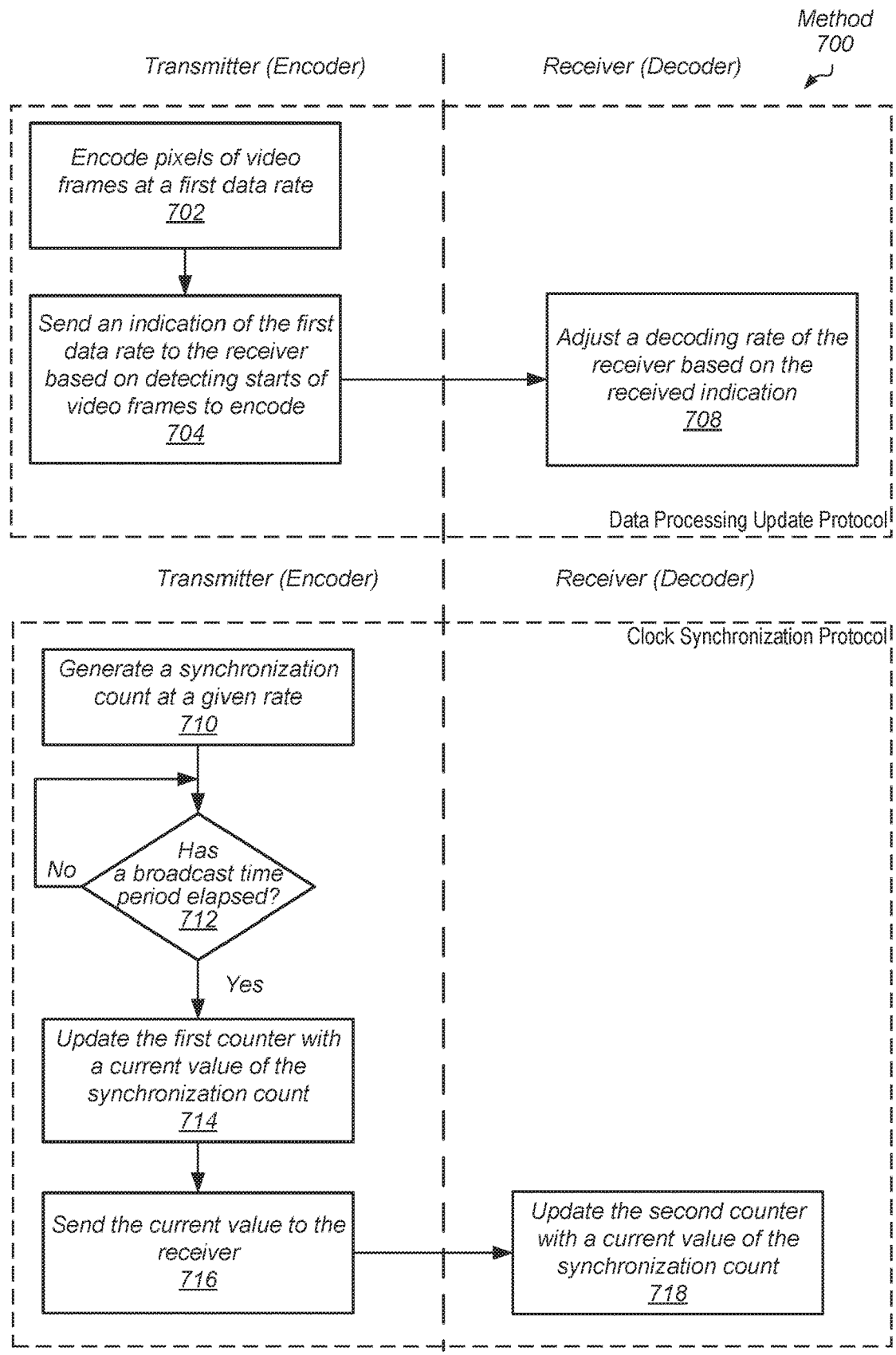
FIG. 7 is a flow diagram of one embodiment of a method for performing efficient video transmission.

Turning to FIG. 7, two concurrent protocols are depicted. The first protocol, blocks 702-708, illustrates a data processing protocol for adjusting a decoding rate in a receiver. The second protocol, blocks 710-718, illustrates a clock synchronization protocol for synchronizing clocks in a transmitter and receiver, which are in separate clock domains. In various embodiments, data is transferred between the transmitter and the receiver via a wireless connection. In summary, during the data processing protocol the transmitter sends data of a video frame in multiple packets to the receiver during a data transmission interval. In various embodiments, data in the first portion of the video frame indicates a start of frame, and data in the portion of the video frame indicates an end of frame. During the clock synchronization protocol, the transmitter periodically sends a synchronization count of the transmitter (e.g., a TSF count) to the receiver. In various embodiment, the transmitter sends the current value of the synchronization count in a beacon frame (e.g., an IEEE 802.11 management frame). These two protocols in FIG. 7 operate concurrently and independently from one another despite each protocol utilizing the same counters in the transmitter and the receiver. For example, while the synchronization protocol uses a TSF count to synchronize the clocks of a transmitter and receiver, the data processing protocol does not use the TSF count to synchronize clocks, but uses the TSF count to adjust a decoding rate in the receiver.

Regarding the data processing update protocol, an encoder within a transmitter encodes pixels of video frames at a first data rate (block 702) and sends the encoded pixels to the receiver. In some embodiments, the transmitter divides the pixel data into portions, which is also referred to as packetizing the pixels. In addition to sending the encoded pixels of a video frame, the transmitter sends an indication of the first data rate to the receiver (block 704). For example, when the encoder detects the start of a next video frame, the encoder captures the current value of a TSF counter in the transmitter and sends this value to the receiver. The receiver, which includes a decoder that decodes pixels at a second data rate, adjusts the decoding rate of the receiver based on the received indication (block 708). For example, in various embodiments, each of the transmitter and the receiver captures respective values of a TSF counter when detecting start of video frame indications. In some embodiments, the receiver uses these respective values to determine a difference between the captured transmitter TSF count and the captured receiver TSF count. Therefore, the receiver, in one embodiment, subtracts the captured receiver TSF count from the captured transmitter TSF count, which may be adjusted based on estimated latencies, to determine the difference. The difference is a positive or negative value based on the values of the captured transmitter TSF count and the captured receiver TSF count. For example, as described above, when these values differ, the receiver determines the first data rate does not match the second data rate, which indicates that the encoding rate does not match the decoding rate. Therefore, the receiver adjusts the second data rate as appropriate to better match the first data rate. It is noted that in various embodiments, the receiver does not adjust its TSF counter as part of the data processing update protocol.

Regarding the clock synchronization protocol, the transmitter generates a synchronization count at a given rate (block 710). In various embodiments, the transmitter uses the IEEE 802.11 wireless local area network (WLAN) standard to provide timing synchronization between the transmitter and the receiver. To achieve timing synchronization, the transmitter periodically transmits timing information through beacon frames. For example, if a time for broadcast of a count has arrived ("yes" branch of the conditional block 712), then logic in the transmitter captures a current value of the synchronization count (block 714). In various embodiments, the synchronization count is represented by a TSF counter in the transmitter. The logic in the transmitter then sends the captured synchronization count to the receiver (block 716). The logic in the receiver then updates a second (local) counter in the receiver with the received value of the synchronization count (block 718). In various embodiments, the second counter is a TSF counter in the receiver. In some embodiments, the logic unconditionally sets the second counter to the received synchronization count. In other embodiments, the logic conditionally updates the second counter after comparing the value stored in the second counter and the received synchronization count. In some embodiments, the logic updates the second counter if the received synchronization count indicates a later point-in-time than that indicated by the second counter.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A receiver comprising:
a transceiver configured to receive encoded pixels of frames; and
logic configured to:
detect a start of frame and a corresponding transmitter counter value in wirelessly received data, wherein the transmitter counter value corresponds to a time at which an encoder of the transmitter detected the start of frame;
capture a receiver counter value responsive to a decoder of the receiver detecting the start of frame;
compare the transmitter counter value to the receiver counter value; and
adjust a pixel decoding rate of a decoder in the receiver based on a difference between the transmitter counter value and the receiver counter value.

2. The receiver as recited in claim 1, wherein
the transmitter counter value is a copy of a value of a timing synchronization function (TSF) counter in the transmitter; and
the receiver counter value is a copy of a value of a TSF counter in the receiver.

3. The receiver as recited in claim 2, wherein the copy of the value of the synchronization counter in the transmitter is a value of the TSF counter in the transmitter at a time of detecting a start of the frame in the transmitter.

4. The receiver as recited in claim 3, wherein the logic is further configured to add an estimated propagation latency value to the transmitter counter value prior to determining said difference.

5. The receiver as recited in claim 3, wherein in response to determining a decoder in the receiver is enabled, the logic is further configured to capture the receiver counter value by capturing a copy of the value of the synchronization counter in the receiver at a detected start of a frame in the receiver.

6. The receiver as recited in claim 3, wherein in response to determining a decoder in the receiver is disabled, the logic is further configured to capture the receiver counter value by capturing a copy of the value of the synchronization counter in the receiver at a time of detecting the corresponding transmitter counter value in wirelessly received data.

7. The receiver as recited in claim 6, wherein in further response to determining the decoder is disabled, the logic is further configured to enable the decoder after a delay based on a difference between the corresponding transmitter counter value and the captured receiver counter value.

8. The receiver as recited in claim 1, wherein the receiver is configured to:
   receive the wirelessly received data including the start of frame and corresponding transmitter counter value in a first type of frame; and
   periodically receive a value of the transmitter counter in a second type of frame, different from the first type of frame, during a clock synchronization protocol.

9. The receiver as recited in claim 1, wherein to adjust the pixel decoding data rate, the logic is further configured to:
   reduce the pixel decoding data rate, in response to determining the transmitter counter value is greater than the receiver counter value; and
   increase the pixel decoding data rate, in response to determining the transmitter counter value is less than the receiver counter value.

10. A method, comprising:
    receiving, by a transceiver of a receiver, encoded pixels of frames from a transmitter;
    detecting, by logic of the receiver, a start of frame and a corresponding transmitter counter value in wirelessly received data, wherein the transmitter counter value corresponds to a time at which an encoder of the transmitter detected the start of frame;
    capturing, by the logic, a receiver counter value responsive to a decoder of the receiver detecting the start of frame;
    comparing, by the logic, the transmitter counter value to the receiver counter value; and
    adjusting, by the logic, a pixel decoding rate of a decoder in the receiver based on a difference between the transmitter counter value and the receiver counter value.

11. The method as recited in claim 10, wherein
    the transmitter counter value is a copy of a value of a timing synchronization function (TSF) counter in the transmitter; and
    the receiver counter value is a copy of a value of a TSF counter in the receiver.

12. The method as recited in claim 11, wherein the copy of the value of the TSF counter in the transmitter is a value of the TSF counter in the transmitter at a time of detecting a start of the frame in the transmitter.

13. The method as recited in claim 12, further comprising adding an estimated propagation latency value to the transmitter counter value prior to determining said difference.

14. The method as recited in claim 10, wherein to adjust the pixel decoding data rate, the method further comprises:
   reducing the pixel decoding data rate, in response to determining the transmitter counter value is greater than the receiver counter value; and
   increasing the pixel decoding data rate, in response to determining the transmitter counter value is less than the receiver counter value.

15. The method as recited in claim 10, further comprising:
   receiving the wirelessly received data including the start of frame and corresponding transmitter counter value in a first type of frame; and
   periodically receiving a value of the transmitter counter in a second type of frame, different from the first type of frame, during a clock synchronization protocol.

16. A system comprising:
    a transmitter configured to:
      encode pixels of frames; and
      transmit the encoded pixels of frames; and
    a receiver configured to:
      receive wireless data including the encoded pixels of frames from the transmitter;
      detect a start of frame and a corresponding transmitter counter value in the received wireless data, wherein the transmitter counter value corresponds to a time at which an encoder of the transmitter detected the start of frame;
      capture a receiver counter value responsive to a decoder of the receiver detecting the start of frame;
      compare the transmitter counter value to the receiver counter value; and
      adjust a pixel decoding rate of a decoder in the receiver based on a difference between the transmitter counter value and the receiver counter value.

17. The system as recited in claim 16, wherein
    the transmitter counter value is a copy of a value of a timing synchronization function (TSF) counter in the transmitter; and
    the receiver counter value is a copy of a value of a TSF counter in the receiver.

18. The system as recited in claim 17, wherein the copy of the value of the TSF counter in the transmitter is a value of the TSF counter in the transmitter at a time of detecting a start of the frame in the transmitter.

19. The system as recited in claim 18, wherein the receiver is further configured to add an estimated propagation latency value to the transmitter counter value prior to determining said difference.

20. The system as recited in claim 16, wherein the receiver is further configured to:
    receive the wirelessly received data including the start of frame and corresponding transmitter counter value in a first type of frame; and
    periodically receive a value of the transmitter counter in a second type of frame, different from the first type of frame, during a clock synchronization protocol.

* * * * *